April 14, 1936. P. SIBER 2,037,278
BEER METER
Filed May 8, 1933
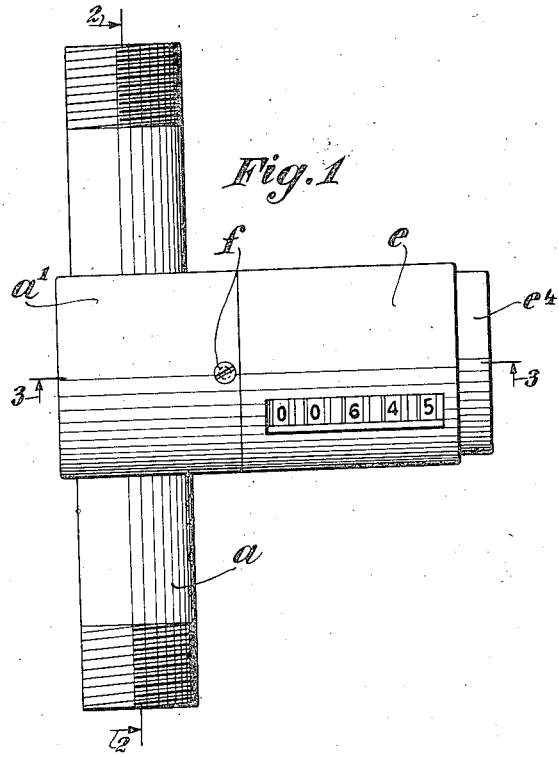
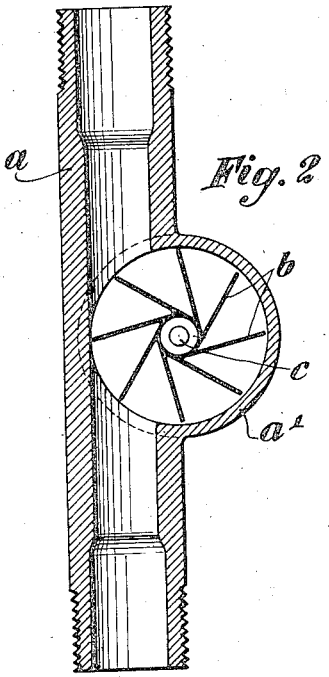
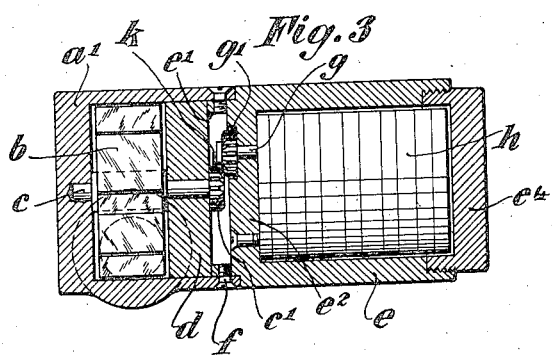
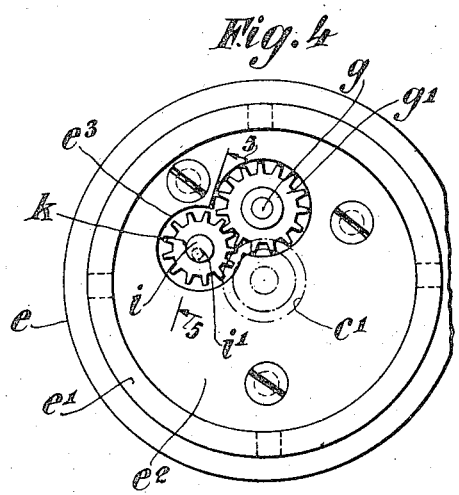
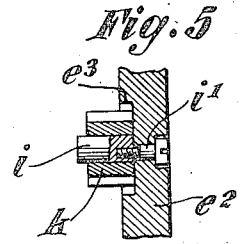
INVENTOR
Paul Siber,
BY Redding, Greeley, O'Shea & Campbell
HIS ATTORNEYS Patented Apr. 14, 1936

2,037,278

UNITED STATES PATENT OFFICE 2,037,278

BEER METER

Paul Siber, New York, N. Y.

Application May 8, 1933, Serial No. 669,868

1 Claim. (Cl. 73—37)

This invention relates to a beer meter used to register quantitatively the number of units of predetermined amount drawn off from a source of supply such as a keg. In practice, for example, it may be desired by the proprietor to know accurately how many glasses of predetermined size have been drawn off, thereby giving him an accurate register of the business done and an accurate register of the quantity of beer actually contained in the keg.

The principal object of the present invention is to provide a meter of the general character indicated which shall be of simple and inexpensive construction, compact, and readily installed as a unitary self-contained device permanently associated with a short pipe length which may be readily coupled in the line. A further object of the invention is to provide a meter unit in which the ratio between the impeller and the counter may be readily changed at the time of assembly to insure accurate registration in desired predetermined conditions. A further object of the invention is to provide a meter in which a counter of standard form may be readily associated with the impeller without change in the counter.

The preferred embodiment of the invention will be described in connection with the accompanying drawing, in which:

Figure 1 is a view in elevation showing the general relationship of parts.

Figure 2 is a view in longitudinal section through the short pipe length, taken on the plane indicated by the line 2—2 of Figure 1 and looking in the direction of the arrows.

Figure 3 is a view in transverse section showing the relationship between the impeller and the counter, and taken on the plane indicated by the line 3—3 of Figure 1, and looking in the direction of the arrows.

Figure 4 is a view in end elevation of the counter showing the transmission gears associated therewith, the case of the counter being detached from the case of the impeller.

Figure 5 is a fragmentary view in section through the end wall of the counter showing one method of providing for the ready interchange of gears to vary the ratio between the impeller and the counter.

There has been illustrated a short pipe section $a$ which may be readily coupled in the line as will be evident. Integral with this pipe element is formed a case $a'$ of suitable configuration to receive an impeller having blades $b$, the impeller being mounted conveniently on a shaft $c$ journaled at one end in the end wall of the case $a'$. The impeller blades are disposed in the path of flow of the beer through the pipe $a$ so that the impeller will be rotated in accurate accordance with the quantity of beer passing through the pipe. The impeller case $a'$ may have a removable side wall $d$, for convenience in initial assembly, and the shaft $c$ of the impeller will extend through this wall as illustrated in Figure 3 and carry on its end a pinion $c'$. With the construction thus described is associated a standard counter which may be contained within a case $e$ adapted to be secured readily to the impeller case $a'$ as by means of a shouldered flange $e'$ and screws $f$. The end wall $e^2$ of the counter case $e$ has journaled therein a drive shaft $g$ for the counter $h$, this drive shaft $g$ carrying at its outer end a pinion $g'$. Rotation of the pinion $c'$ on the impeller shaft $c$ is transmitted to the driving pinion $g'$ for the counter $h$ through an intermediate pinion $k$ which meshes with the pinions $c'$ and $g'$. For compactness, it is preferred to provide the end wall $e^2$ of the counter with recesses $e^3$ of suitable configuration to receive the pinions $g'$ and $k$ and it is further desirable to bevel the outer ends of the teeth of the pinions $c'$ and $g'$ so that even though these pinions may somewhat overlap they will not actually interfere with one another. The pinion $k$ may have any desired predetermined number of teeth whereby the effective ratio between the pinions $c'$ and $g'$ may be predetermined upon assembly to fix the effective ratio between the counter and the impeller. When the size of the pinion $k$ is changed it is evident that its axis of rotation must be relocated with respect to both the impeller shaft $c$ and the counter shaft $g$. Many convenient devices for permitting this accommodation will suggest themselves to those skilled in the art. The one illustrated in Figure 5 will be found convenient. As there shown, the supporting shaft $i$ for the pinion $k$ is secured onto the end wall $e^2$ of the counter case by means of a screw $i'$ which passes through the end wall $e^2$ and engages the shaft $i$ eccentrically. Obviously, the screw $i'$ may be loosened and the shaft $i$ shifted to change the location of its axis whereupon the screw $i'$ can be tightened to hold the shaft $i$ fixedly. In this way, the initial proper relation of the pinion $k$ to the other pinions $c'$ and $g'$, with which it meshes, may be readily determined upon assembly.

The end screw cap $e^4$ may constitute the end wall for the counter case $e$ and afford ready access to the counter as will be evident.

The operation of the meter will be apparent from the association of parts described, it being understood that all of the beer flowing through the pipe $a$ will be metered and an indication of the quantity given by the counter. The units of the counter may obviously represent any desired predetermined units of quantity and as indicated above by changing the transmission pinion $k$ the ratio between the impeller and the counter may be varied initially.

Changes in details of construction and design may be made by one skilled in the art without departing from the invention.

I claim as my invention:

A beer meter comprising a pipe through which beer flows, a case formed in the wall of the pipe, a blade impeller journaled in the case and having its axis at right angles to the path of travel of the beer and its blades disposed within said path, a removable plate constituting a wall for the case to prevent the escape of beer and in which the shaft of the impeller is journaled, a pinion on the outer end of the impeller shaft, a counter mounted on the case and having an end wall in juxtaposition to said plate but spaced therefrom to form a pinion housing, a pinion on the counter shaft within the pinion housing, an intermediate pinion in mesh with said two first named pinions to transmit rotation of the impeller pinion to the counter pinion, a stub shaft on which the said intermediate pinion is mounted, and means to mount the stub shaft on the end wall with provision for turning motion of the shaft upon an axis eccentric of the shaft to shift the axis of the stub shaft in relation to the shafts of the impeller and counter, for the accommodation of intermediate pinions of varying sizes.

PAUL SIBER.